Jan. 16, 1940. H. A. HUSTED 2,187,604

AUTOMOBILE STEERING WHEEL CONSTRUCTION

Filed Nov. 29, 1935

INVENTOR.
HARRY A. HUSTED,
BY
ATTORNEY.

Patented Jan. 16, 1940

2,187,604

UNITED STATES PATENT OFFICE 2,187,604

AUTOMOBILE STEERING WHEEL CONSTRUCTION

Harry A. Husted, Sandusky, Ohio, assignor, by mesne assignments, to The Standard Products Company, Port Clinton, Ohio, a corporation of Ohio Application November 29, 1935, Serial No. 52,157

5 Claims. (Cl. 74—552)

This invention relates to an improvement in automobile steering wheels and more particularly to the simple rigid construction thereof.

One object of the invention lies in the provision of a steering wheel which is light and graceful in appearance and extremely strong in construction.

The present invention comprises a minimum number of simple parts which are assembled easily and quickly in large production quantities with the minimum amount of scrap or waste material.

The cheapness of construction is a major consideration in the design of an automobile steering wheel since only a few mills difference in the cost per wheel of two different makes will determine whether a manufacturer will obtain or lose a large contract order from some automobile manufacturing concern. Applicant has succeeded in minimizing the cost of his wheel by reducing the inherent waste material to the least possible amount and also by cutting down the number of operations necessary in assembling. Since the parts are few and simple, it follows that the chances of producing a wheel which will not pass inspection, whether through the fault of the operator or the assembling machine, are exceedingly small.

Another object of the invention lies in the provision of a steering wheel having a hub which combines the advantages in strength of a solid casting with the extreme lightness and minimum quantity of material of a sheet metal structure.

Applicant realizes that from the standpoint of the driver or occupant of an automobile, the feature of strength is also a major consideration. Modern cars which are built for speed must also be built for the protection of the passengers in case of an emergency, which is evidenced by the fact that all stock cars of any importance are equipped with shatter-proof windshields and all steel frames and bodies.

The steering wheel is the first object a driver will contact in such emergencies, and oftentimes the momentum of his body is sufficient to tear a spoke loose from the hub or rim on a wheel not constructed to withstand such a force. The loose spoke may cause serious injury to a person who would otherwise be unharmed.

A further object is to provide a steering wheel, the spokes of which are positively anchored to the rim and hub members.

Another object is to provide a steering wheel having a thin layer of thermoplastic material covering a portion thereof which can be applied quickly and cheaply.

A further object of this invention is to construct a steering wheel having a hollow rim of a unitary structure and having a maximum compressive strength because of the absence of apertures, indentures, or other irregularities through or on the surface of the rim which have previously been necessary for the purpose of connecting the spokes onto the rim.

A still further object of this invention is to provide a simplified means of properly mounting the spokes onto the rim surface for the purpose of permanent connection.

Other objects will be apparent upon consideration of the following specification which is taken in conjunction with the accompanying drawing, in which—

Figure 1:
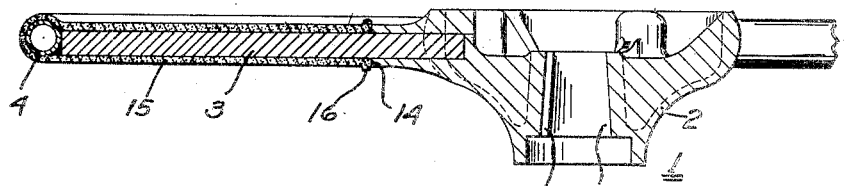
Fig. 1 is a fragmentary sectional view taken through the hub and one spoke.
Figure 2:
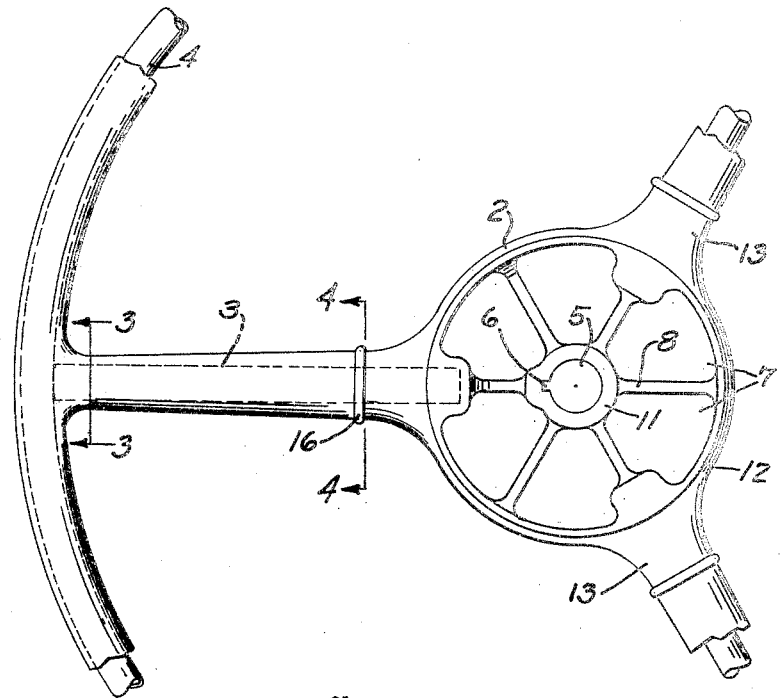
Fig. 2 is a plan view of the wheel shown in Fig. 1.
Figure 3:
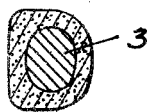
Fig. 3 is a sectional view through the spoke taken substantially on the line 3—3 of Fig. 2.
Figure 4:
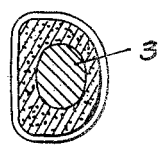
Fig. 4 is another sectional view through the spoke taken substantially on the line 4—4 of Fig. 2.

Referring to Fig. 1, the steering wheel, indicated by 1, is shown comprising a hub 2, spokes 3, and a rim 4. The hub 2 includes the tapered opening 5 at the center, which is provided with a keyway 6 cut substantially parallel to the walls of the opening to provide a means for mounting and securing the steering wheel to a standard steering column. The hub is preferably provided with a plurality of recesses 7 which are defined by radially extending webs 8 integrally connecting the inner portion 11 with the outer shell portion 12. This web construction provides an extremely strong and light hub which is inexpensive to produce. The webs and shell portion of the hub are preferably uniform in thickness to minimize cooling strains and to produce a casting which is light and inexpensive.

Projecting radially from the shell portion 12 are a plurality of stub arms 13, the contour of which blends into the surface of the shell portion. These arms are adapted to receive spokes 3 which may be cast into the hub. The portion of the spoke lying within the hub fuses with the molten metal of the casting, thus insuring a positive connection therebetween. The spokes may be arranged and retained in the sand impression of the hub by means of a jig while the molten metal is being poured. Consideration has been given to the properties of the metals used in the hub and spoke portion for the purpose of obtaining the proper union between them.

The arms 13 sharply terminate at 14, forming definite shoulders with respect to the spokes 3. Although the spokes are shown solid and substantially elliptical in cross section, it is understood that other shapes may be employed to give the required strength and to serve the same purpose. The principal reason for showing a spoke of this shape is to illustrate how bars of any standard cross section may be utilized in the manufacture of the present invention.

The outer ends of the spokes in Fig. 1 are welded directly to the rim 4. It will be noted that the bottom of the rim lies in the plane defined by the bottom lines of the spokes and that the top of the rim lies above the plane determined by the top of the spokes. This particular embodiment which employs welding alone as a medium of connection may result in a more rigid joint.

The rim is shown constructed of a section of round tubing bent in the form of a ring with the ends butt welded together as at 10.

Figure 5:
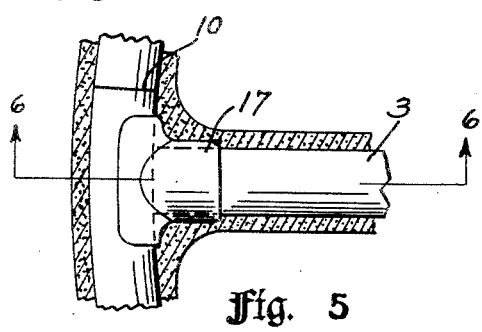
Fig. 5 is a plan view, partly in section, showing another method of anchoring the spokes to the rim.
Figure 6:
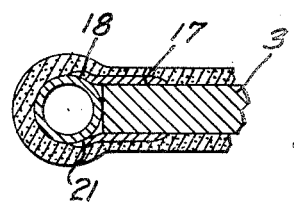
Fig. 6 is a sectional view through the rim taken on the line 6—6 of Fig. 5.

Another method of joining the spokes to the rim is illustrated in Figs. 5 and 6, in which a sleeve 17 is shown telescoping one end of the spoke 3 and having flanges 18 and 21 shaped to the contour of the rim 4. These sleeves may be placed on the spokes prior to the welding operation so that when the spokes and hub are set in the proper position relative to the rim, the sleeves may be moved outwardly along the spokes until the flanges 18 and 21 engage the rim, as shown in Fig. 5. The flanges 18 and 21 lie beyond the end of the spokes and are adapted to embrace a portion of the rim surface so as to locate the rim and spokes in a predetermined position relative to each other. In this position, the sleeves are welded simultaneously to the spokes and rim to form a strong permanent connection therebetween.

It is to be observed that the methods of joining the spokes onto the rim surface require no penetration into the rim material, nor does it require any indenture to be made in the rim surface, either of which would materially decrease the compression strength of the rim in resisting the comparatively high pressures which are necessary in applying such coatings as thermoplastics or any cellulose acetates.

From the foregoing description, it will be seen that applicant has disclosed a steering wheel of modern design having a few simple parts which are easily and quickly assembled in modern production quantities, and which provides great strength for its weight to resist forces tending to loosen a spoke from the rim or hub.

In a machine especially designed for testing the break-down load, applicant has conducted numerous comparative tests with similar appearing wheels of different makes and found that the present construction was far superior to any of the others.

By methods shown and described in applicant's pending applications, Serial No. 763,484, filed July 23, 1934, and Serial No. 47,655, filed October 31, 1935, the thin uniform layer of thermoplastic material 15, such as cellulose acetate, which has heretofore not been used by others because of expense and difficulties in application, may be efficiently and economically applied to any part or parts of the steering wheel.

Although applicant has shown and described but two modifications of his invention, he does not intend to be limited thereto since it may be apparent to those familiar with the art that other modifications may be constructed without deviating from the spirit and scope as defined in the hereunto annexed claims.

Having thus described my invention, what I claim is:

1. An automobile steering wheel comprising a hub, solid unit spoke members and an imperforate tubular rim annulus, said hub having short radially projecting arms with radial openings therein for receiving and retaining one end of each of said spoke members, a tubular sleeve embracing the other end of each spoke member and extending therebeyond, said tubular sleeves having portions partially embracing the inner periphery of the rim, said sleeves being welded to the spokes and rim concurrently.

2. An automobile steering wheel comprising a cast metal hub, solid spoke members and an imperforate tubular rim annulus, said hub having short radial arms, one end of each spoke member being embedded in and permanently joined to its associated radial arm, sheet metal sleeves embracing the opposite ends of said spokes and having flanges contiguous with the inner peripheral portion of the rim, said sleeves each being welded to the associated spoke member and to the rim annulus concurrently.

3. In an automobile steering wheel, a cast metallic hub, solid metallic spokes fixedly secured to and projecting radially from the hub and a hollow imperforate metal rim annulus of circular cross section, means for permanently and rigidly securing the spokes to the rim annulus, said means comprising preformed sleeves of sheet metal tubing, each having a portion embracing the outer end surface of the associated spoke and also having flanges conforming to the curved surfaces and embracing a portion of the inner periphery of the rim annulus, the spoke embracing portions of said sleeves being permanently welded to the associated spokes and said flanges being permanently welded to said rim annulus and said rim and spokes being enveloped in a finishing coating of thermoplastic material.

4. An automobile steering wheel comprising a hub, spoke members having closed ends and an imperforate rim annulus, one end of each spoke member being embedded in and retained by said hub and projecting substantially radially outwardly therefrom, a preformed tubular sleeve embracing the outer end portion of each spoke member, said sleeve having a flange portion extending therebeyond and embracing a part of the inner perimeter of the rim and being permanently joined to both the rim and the associated spoke member.

5. An automobile steering wheel comprising a hub, solid spoke members and an imperforate tubular rim annulus, said hub having short radial arms, one end of each spoke member being embedded in its associated radial arm, sheet metal sleeves embracing the opposite ends of said spokes and having flanges contiguous with the inner peripheral portion of the rim, said sleeves each being welded to the associated spoke member and to the rim annulus concurrently.

HARRY A. HUSTED.